United States Patent

Tamori et al.

[11] Patent Number: 5,960,445
[45] Date of Patent: Sep. 28, 1999

[54] INFORMATION PROCESSOR, METHOD OF UPDATING A PROGRAM AND INFORMATION PROCESSING SYSTEM

[75] Inventors: Hirofumi Tamori, Tokyo; Daisuke Hiraoka; Koji Enoki, both of Kanagawa, all of Japan

[73] Assignee: Sony Corporation, Tokyo, Japan

[21] Appl. No.: 08/842,841

[22] Filed: Apr. 17, 1997

[30] Foreign Application Priority Data

Apr. 24, 1996 [JP] Japan ................................ 8-102204

[51] Int. Cl.⁶ ........................................... G06F 17/30
[52] U.S. Cl. ............................ 707/203; 707/202; 713/2; 713/100; 395/712
[58] Field of Search ................................. 707/201, 202, 707/203; 348/473, 10; 714/6; 395/653, 652, 712; 713/2, 100

[56] References Cited

U.S. PATENT DOCUMENTS

| | | | |
|---|---|---|---|
| 5,432,927 | 7/1995 | Grote et al. | 395/652 |
| 5,437,018 | 7/1995 | Kobayashi | 713/2 |
| 5,530,943 | 6/1996 | Gericke et al. | 713/2 |
| 5,544,356 | 8/1996 | Robinson et al. | 707/205 |
| 5,548,338 | 8/1996 | Ellis et al. | 348/473 |
| 5,619,250 | 4/1997 | McClelland et al. | 348/10 |
| 5,666,530 | 9/1997 | Clark et al. | 707/201 |
| 5,752,042 | 5/1998 | Cole et al. | 395/712 |
| 5,794,054 | 8/1998 | Le et al. | 395/728 |
| 5,835,760 | 11/1998 | Harmer | 395/652 |
| 5,835,761 | 11/1998 | Ishii et al. | 395/653 |
| 5,838,981 | 11/1998 | Gotoh | 395/712 |
| 5,864,698 | 1/1999 | Krau et al. | 395/652 |
| 5,870,520 | 2/1999 | Lee et al. | 714/6 |

OTHER PUBLICATIONS

IBM Technical Disclosure Bulletin, vol. 38, No. 7, Jul. 1995, New York, US, p. 551, XP000521789, "Recovery Method for Damaged Firmware."

*Primary Examiner*—Thomas G. Black
*Assistant Examiner*—Charles L. Rones
*Attorney, Agent, or Firm*—Limbach & Limbach L.L.P.

[57] ABSTRACT

BIOS updating is performed after saving an old BIOS to a spare storage area. A current version BIOS stored in a first bank of a flash ROM is moved to a second bank of the flash ROM, and a new BIOS supplied from a home server to a network interface card is stored in the first bank to complete BIOS updating. If the new BIOS does not run well, the old BIOS in the second bank of the flash ROM is moved to the first bank through a RAM to be reinstalled.

9 Claims, 18 Drawing Sheets

[STEP S5]

[STEP S12]

INFORMATION PROCESSOR, METHOD OF UPDATING A PROGRAM AND INFORMATION PROCESSING SYSTEM

BACKGROUND OF THE INVENTION

1. Field of the Invention

The present invention relates to an information processor, a method of updating a program and an information processing system and, more particularly, to an information processor, a program updating method and an information processing system suitable for updating a program such as a basic input/output system (BIOS) via a network.

2. Description of the Related Art

Networks of a kind represented by the Internet have been developed, to which network users can connect personal computers or the like to obtain various kinds of information.

A connection to the Internet or the like can be made through a communication network such as an analog telephone network or the Integrated Services Digital Network (ISDN). Recently, it has become possible to gain access to networks including the Internet through cables of a cable television (CATV) system.

For access to a network such as the Internet, an information processor having a transmitting and receiving circuit for transmission and reception through a predetermined communication network is used.

FIG. 9 shows an example of such an information processor using a modem 105 and capable of transmission and reception through an analog telephone circuit. A central processing unit (CPU) 101 executes various processings in accordance with programs stored in a flash electrically erasable programmable ROM (hereinafter referred to simply as "flash ROM") 102. Necessary data for execution of various processings performed by the CPU 101 and other data are suitably stored in a RAM 103. The CPU 101 receives data transmitted from the analog telephone circuit by using the modem 105. The CPU 101 processes the received data and displays, for example, received image data on a display unit (not shown) through a display interface 106.

A basic input/output system (BIOS), which is run by the CPU 101 when the processor is started up, and which is a basic program (a group of hardware-dependent control programs) for setting a configuration of the RAM 103 or initialization of a floppy disk drive 104, is stored in the flash ROM 102 as well as the programs for processing data supplied through the modem 105. The flash ROM 102 is an electrically erasable and programmable nonvolatile memory in which stored contents can be changed. The flash ROM 102 of such an erasable and programmable type is used to enable the BIOS to be updated according to a change in the specifications of units connected to the processor or according to updating of the operating system (OS) of the processor.

The BIOS in this information processor is updated as described below. First, a predetermined program for updating the BIOS is started and the BIOS stored in the flash ROM 102 is recorded on a floppy disk by the floppy disk drive 104. Thereafter, the floppy disk is taken out and another floppy disk on which a new BIOS is recorded is inserted into the floppy disk drive 104, and the new BIOS is stored in the flash ROM 102.

The step of recording the former BIOS on a floppy disk in this updating process is performed for the purpose of reinstalling the former BIOS if updating of the BIOS ends in failure, for example, if the floppy disk on which the new BIOS is recorded has such a defect that the new BIOS cannot be read out, or if the program of the new BIOS has a defect (bug) and cannot run normally.

However, BIOS updating is performed in a different manner in the case of an information processor having no floppy disk drive, e.g., a set top box (STB) used for access to a network such as the Internet through a cable of a CATV system. For example, in such an information processor, an external terminal unit is connected to a predetermined terminal provided in the information processor, and a BIOS is saved to the terminal unit before it is updated. For such BIOS updating, complicated operations are required.

SUMMARY OF THE INVENTION

In view of the above-described circumstances, an object of the present invention is to provide an information processor, a program updating method and an information processing system arranged to save a current BIOS in a spare storage area before updating of the BIOS in order to enable the BIOS to be immediately reinstalled if writing of a new BIOS ends in failure and to prevent the old BIOS from being lost by an operation error or the like.

To achieve the above-described object, according to one aspect of the present invention, there is provided an information processor comprising storage means having a main area in which a current basic program is stored, a common area in which an updating program describing a procedure for updating the basic program is stored, and a spare area in which the basic program is stored before it is updated, and processing means for performing updating on the basis of the updating program stored in the common area of the storage means, the updating including copying to the spare area the current basic program read out from the main area and finally writing a new basic program to the main area.

According to another object of the present invention, there is provided a program updating method of updating a current basic program stored in a main area of storage means by replacing the current basic program with a new basic program on the basis of an updating program stored in a common area of the storage means, the method comprising the steps of copying to the spare area of the storage means the current basic program read out from the main area, and finally writing the new basic program to the main area on the basis of the updating program.

According to still another aspect of the present invention, there is provided an information processing system comprising information providing means for providing information through a predetermined transmission channel, and information processing means for performing updating on the basis of an updating program stored in a common area of storage means, the updating including copying to a spare area of the storage means a current basic program read out from a main area of the storage means and finally writing to the main area of the storage means a new basic program supplied through the transmission channel.

DESCRIPTION OF THE PREFERRED EMBODIMENT

Figure 1:
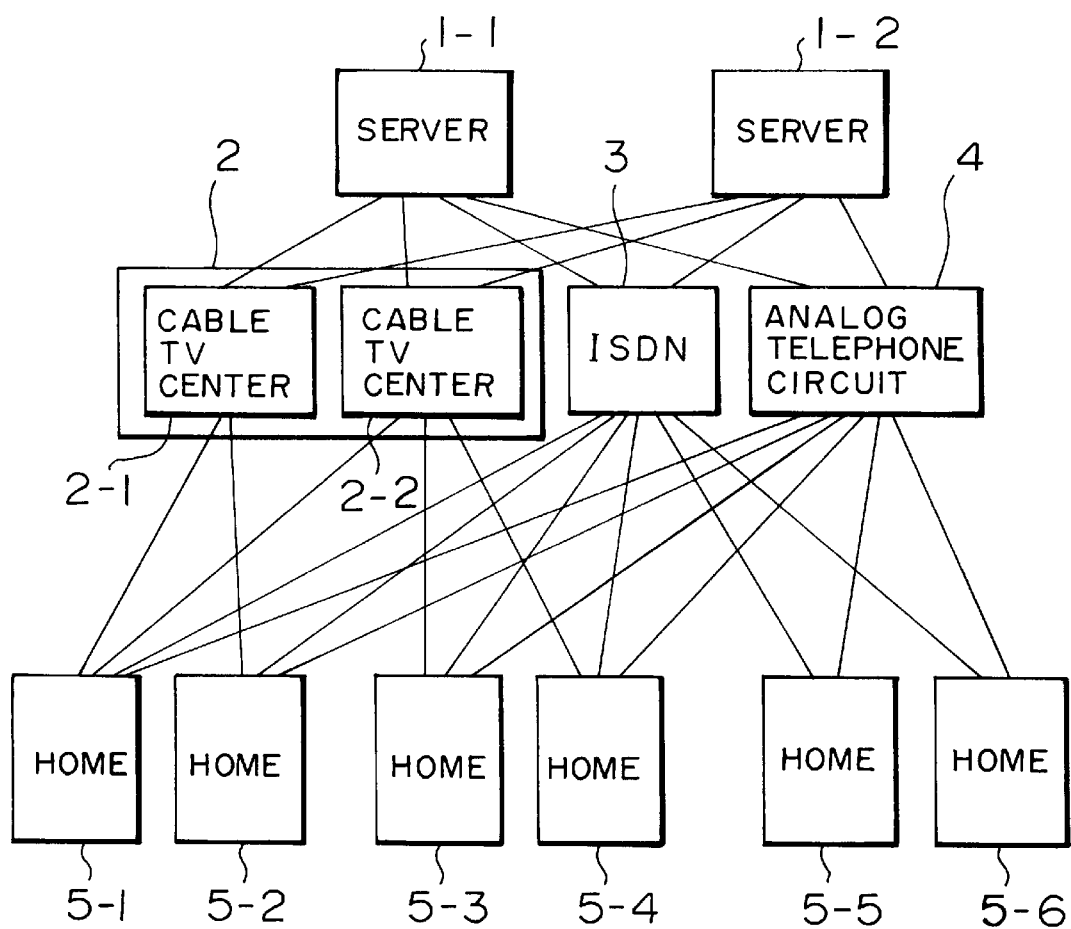
FIG. 1 is a diagram showing the configuration of an information providing system to which an information receiving system of the present invention is applied.

FIG. 1 is a diagram showing the configuration of an information providing system which is an embodiment of the information processing system of the present invention. Servers 1-1 and 1-2 (information providing means) provide information consisting mainly of images and sounds accompanying the images or other kinds of data and relating to video on-demand (VOD) services to homes 5-1 to 5-6 through networks. As networks in this system, a cable television network 2, the Integrated Services Digital Network (ISDN) 3, an analog telephone circuit 4 are used.

For example, the server 1-1 provides information to a cable television center 2-1 or 2-2 through the cable television network 2. The cable television center 2-1 provides the provided information to the homes 5-1 and 5-2 of subscribers for the cable television system. Similarly, the cable television center 2-2 provides information to the homes 5-1, 5-3, and 5-4 of subscribers for the corresponding cable television system.

The server 1-1 also provides information through the ISDN 3 or the analog telephone circuit 4. From each of the homes 5-1 to 5-6, the server 1-1 can be accessed through the ISDN 3 or the analog telephone circuit 4, and each home can be provided with information through this network or circuit.

The server 1-2 also provides various kinds of information to the homes 5-1 to 5-6, as does the server 1-1.

This video transmission system may be such that trunks corresponding to transmission channels are formed of optical fibers, optical fiber nodes covering 300 to 500 homes are provided, and hybrid fiber coaxes (HFCs), i.e., coaxial cable for information transmission are used between the optical fiber nodes and the homes. Alternatively, a fiber-to-the-curve (FTTC) system may be formed in which information is transmitted to a pedestal (repeater) covering 24 homes or so, i.e., a vicinal area about one home through an optical fiber and is transmitted form the pedestal to each home through a coaxial cable, or a fiber-to-the-home (FTTH) system may be formed in which information is transmitted to homes through optical fibers.

In the embodiment shown in FIG. 1, the transmission capacity of the cable television network 2 is larger than that of the ISDN 3, which is larger than that of the analog telephone circuit 4. Accordingly, if the cable television network 2 is used, moving images highest in quality and in moving speed can be received in a real time manner at each home. In the case of using the ISDN 3, ordinary moving images, which do not move so quickly as those receivable through the cable television network 2, can be received in a real time manner. However, moving images cannot be received in a real time manner through the ISDN 3 if they move at an excessively high speed. In contrast, in the case of using the analog telephone circuit 4, moving images cannot be received and only still images can be received since the transmission capacity is small. Audio signals can be received in a real time manner by using each of the above-described networks.

Figure 2:
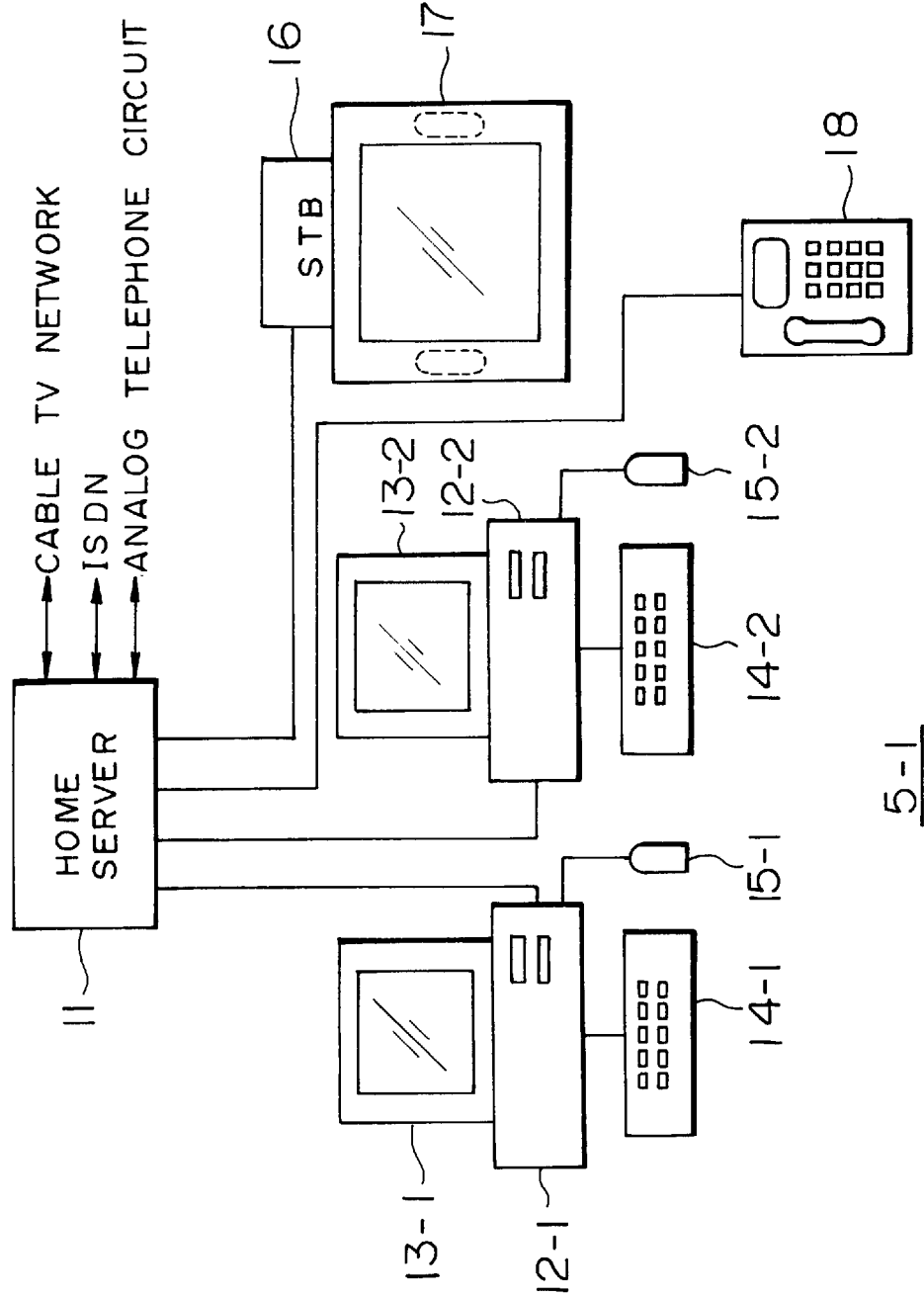
FIG. 2 is a diagram showing the configuration of an information processor in home 5-1 shown in FIG. 1.

FIG. 2 shows the configuration of an information receiving system provided in the home 5-1. Information processing systems (not shown) which are basically the same as that provided in the home 5-1 are also provided in the other homes.

A home server 11 connects to the cable television network 2, the ISDN 3 and the analog telephone circuit 4 and connects at least one of these networks to a personal computer 12-1, a personal computer 12-2, an STB 16 (information processing means) or a telephone set 18.

A keyboard 14-1 and a mouse 15-1 are connected to the personal computer 12-1 to input various instructions. Images output from the personal computer 12-1 as desired are displayed on a display unit 13-1.

Similarly, a keyboard 14-2 and a mouse 15-2, and a display 13-2 are connected to the personal computer 12-2.

The STB 16 receives image data supplied from the home server 11, demodulates the received image data and outputs the demodulated data to a television receiver 17 to display corresponding images. The STB 16 is also used for a video on-demand (VOD) service for providing programs in response to user's requests. The telephone set 18 enables telephonic communication through the home server 11.

Figure 3:
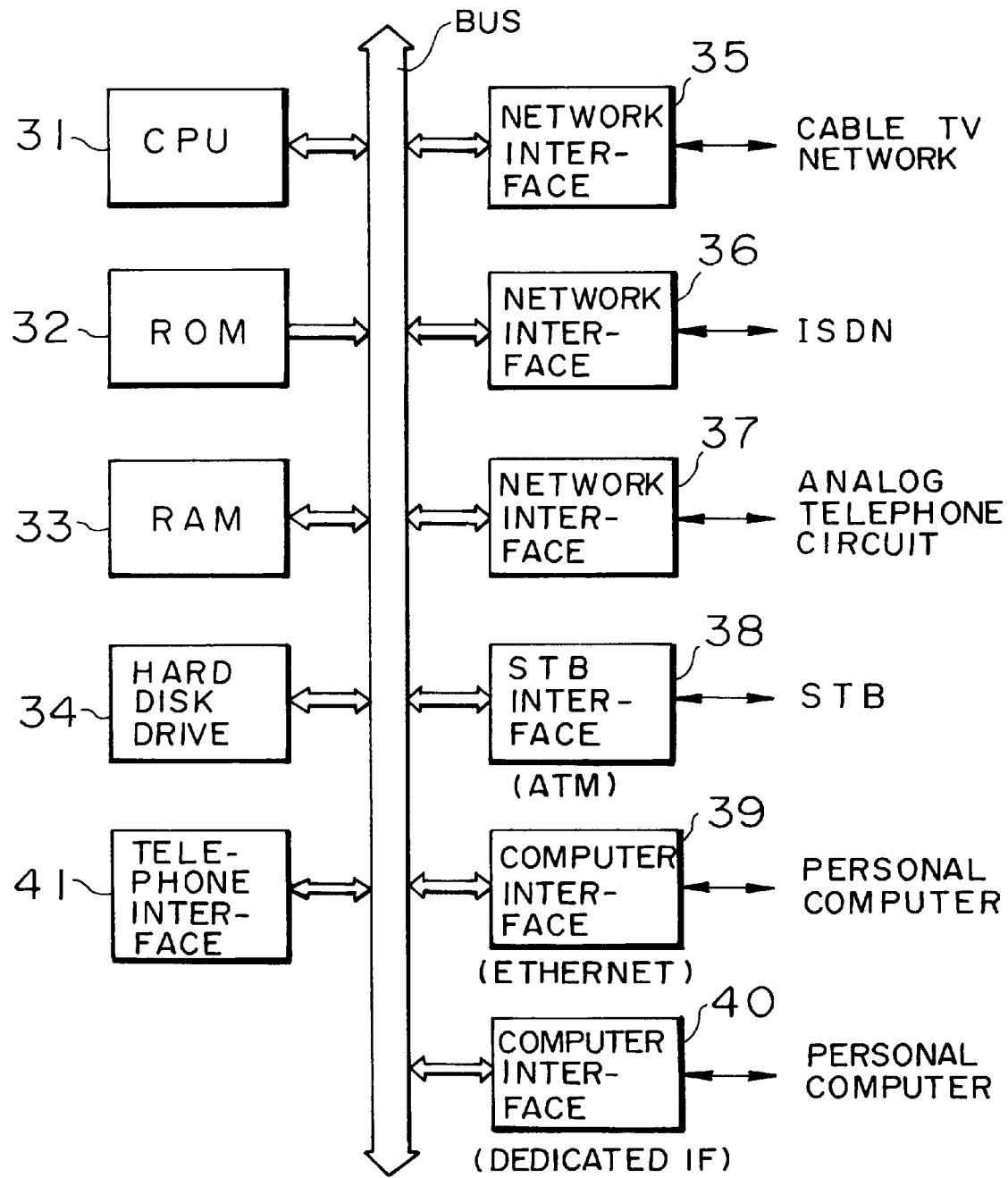
FIG. 3 is a block diagram showing the internal configuration of home server 11 shown in FIG. 2.

FIG. 3 shows the configuration of components of the home server 11. A CPU 31 executes various processings in accordance with programs stored in a ROM 32. Necessary data for execution of various processings performed by the CPU 31 and other data are suitably stored in a RAM 33. A hard disk drive 34 records information on its internal hard disk and reproduces information from the hard disk.

The home server 11 has various interfaces. Each of network interfaces 35 to 37 interfaces with the cable television network 2, the ISDN 3 or the analog telephone circuit 4 for data exchange with the same. An STB interface 38 interfaces with the STB 16 in an asynchronous transfer mode (ATM). A computer interface 39 is connected to the personal computer 12-1 and interfaces for Ethernet communication. A computer interface 40 is connected to the personal computer 12-2 and interfaces in accordance with special protocols for the personal computer 12-2. A telephone interface 41 interfaces with the telephone set 18.

Figure 4:
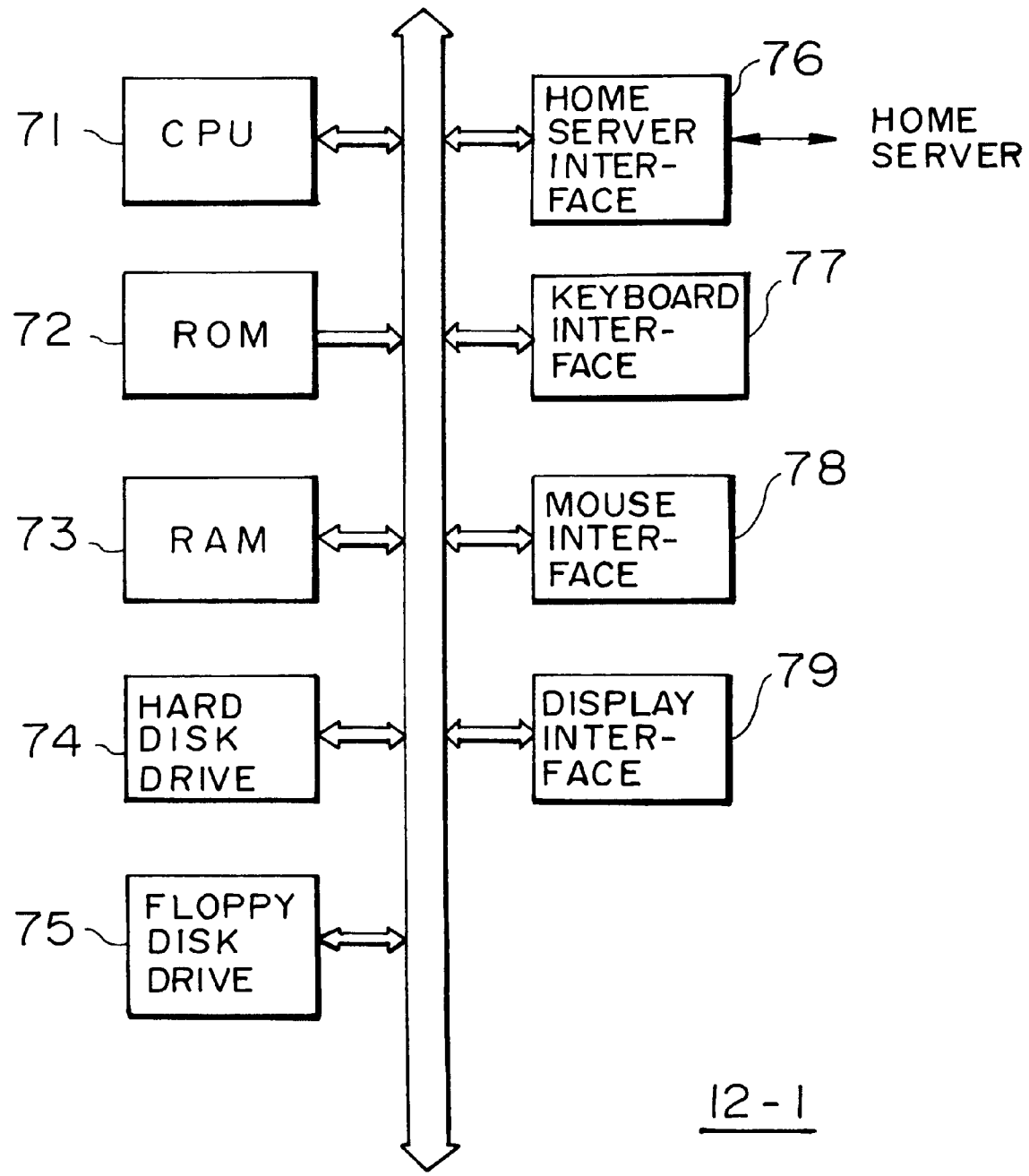
FIG. 4 is a block diagram showing the internal configuration of personal computer 12-1 shown in FIG. 2.

FIG. 4 shows the configuration of components of the personal computer 12-1. A CPU 71 executes various processings in accordance with programs stored in a ROM 72. Necessary data for execution of various processings performed by the CPU 71 and other data are suitably stored in a RAM 73. A hard disk drive 74 records information on its internal hard disk and reproduces information from the hard disk. A floppy disk drive 75 executes processing for recording information on a floppy disk or reproducing information from a floppy disk.

A home server interface 76 interfaces with the home server 11. A keyboard interface 77 and a mouse interface 78 interface with the keyboard 14-1 and the mouse 15-1, respectively. A display interface 79 interfaces with the display 13-1.

The personal computer 12-2 is constructed in the same manner as the personal computer 12-1.

Figure 5:
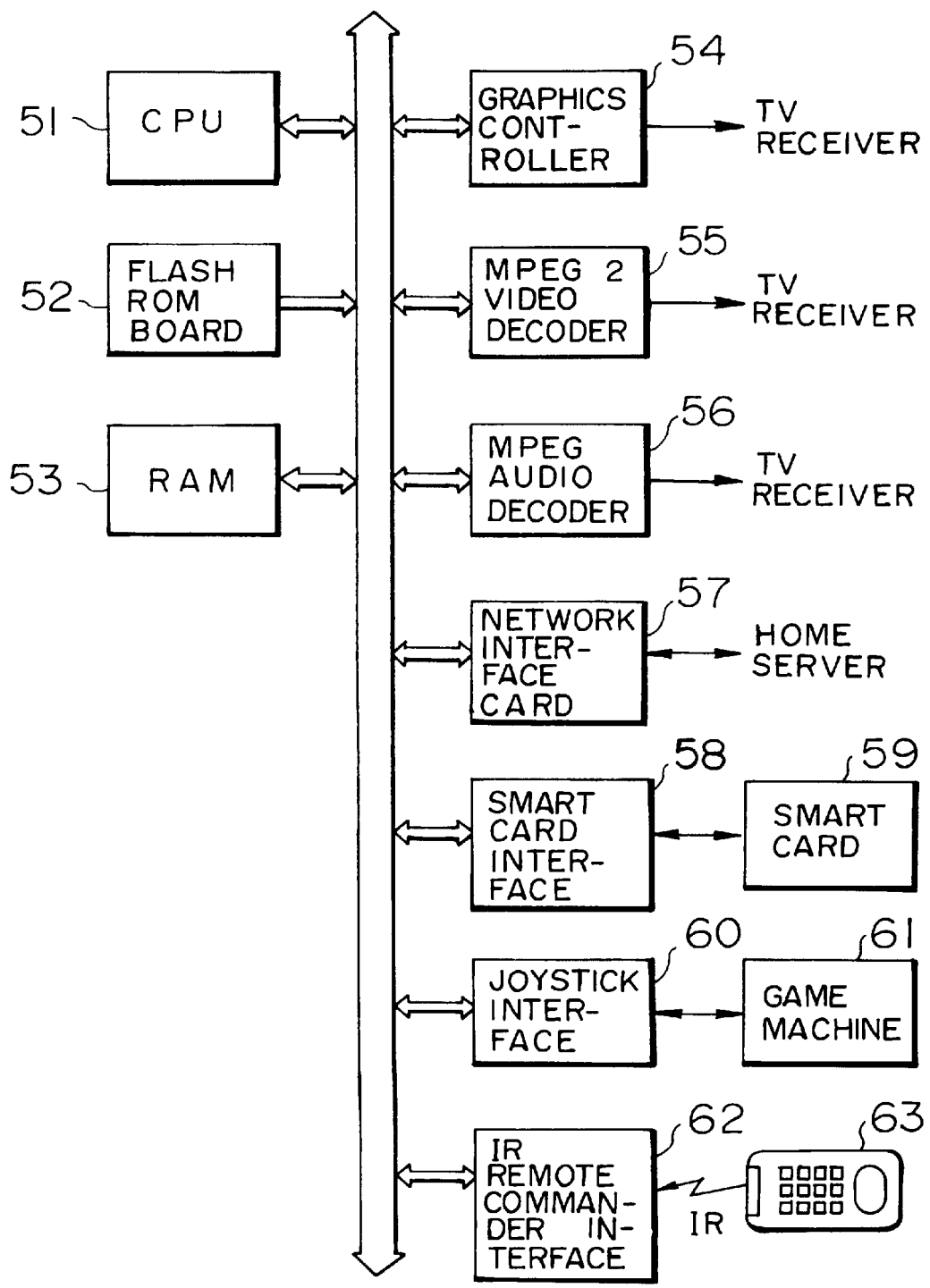
FIG. 5 is a block diagram showing the internal configuration of STB 16 shown in FIG. 2.

FIG. 5 shows the configuration of components of the STB 16, which is an information processor, and which represents an embodiment the present invention. A CPU 51 (processing means) executes various processings in accordance with programs stored in a flash ROM 91 (storage means) mounted on a flash ROM board 52. Necessary data for execution of various processings performed by the CPU 51 and other data are suitably stored in a RAM 53. A graphic controller 54 is supplied with graphic data from the CPU 51 and outputs the graphic data to the television receiver 17 to display the data. A Moving Picture Experts Group (MPEG) 2 video decoder 55 and an MPEG audio decoder 56 respectively decode video data and audio data supplied from the home server 11 through a network interface card 57 (receiving means) by MPEG 2 and MPEG systems, and output the decoded data to the television receiver 17 to display images and to radiate sounds.

The network interface card 57 is connected between the STB 16 and the home server 11 to interface with the home server 11. A smart card interface 58 interfaces with a smart card 59, which is detachably attached to the STB 16 when necessary. Personal information of the card user, key information for scrambling data, accounting information and the like are stored in the smart card 59.

A joystick interface 60 interfaces with a game machine 61 connected to the STB 16. An infrared ray (IR) remote commander interface 62 receives an infrared ray (IR) signal from a remote commander 63 and outputs a corresponding command to the CPU 51.

A BIOS (a group of hardware-dependent control programs in the operating system run by the CPU 51), which is a group of basic programs run by the CPU 51 at the time of a start-up of the information processor to set a configuration of RAM 53 and to control data exchange with an external unit such as game machine 61, is stored in the flash ROM 91 mounted on the flash ROM board 52 along with the programs for processing data supplied through the network interface card 57. The flash ROM 91 on the flash ROM board 52 is an electrically erasable and programmable nonvolatile memory in which stored contents can be changed, and which maintains stored contents even after turning-off of the power supply. The flash ROM 91 of such an electrically erasable and programmable type is used to enable the BIOS to be updated according to one's need. A new BIOS is transmitted from the server 1-1 or server 1-2 to be supplied to the STB 16 through a predetermined communication circuit and through the home server 11 and is received by the network interface card 57 of the STB 16.

Figure 6:
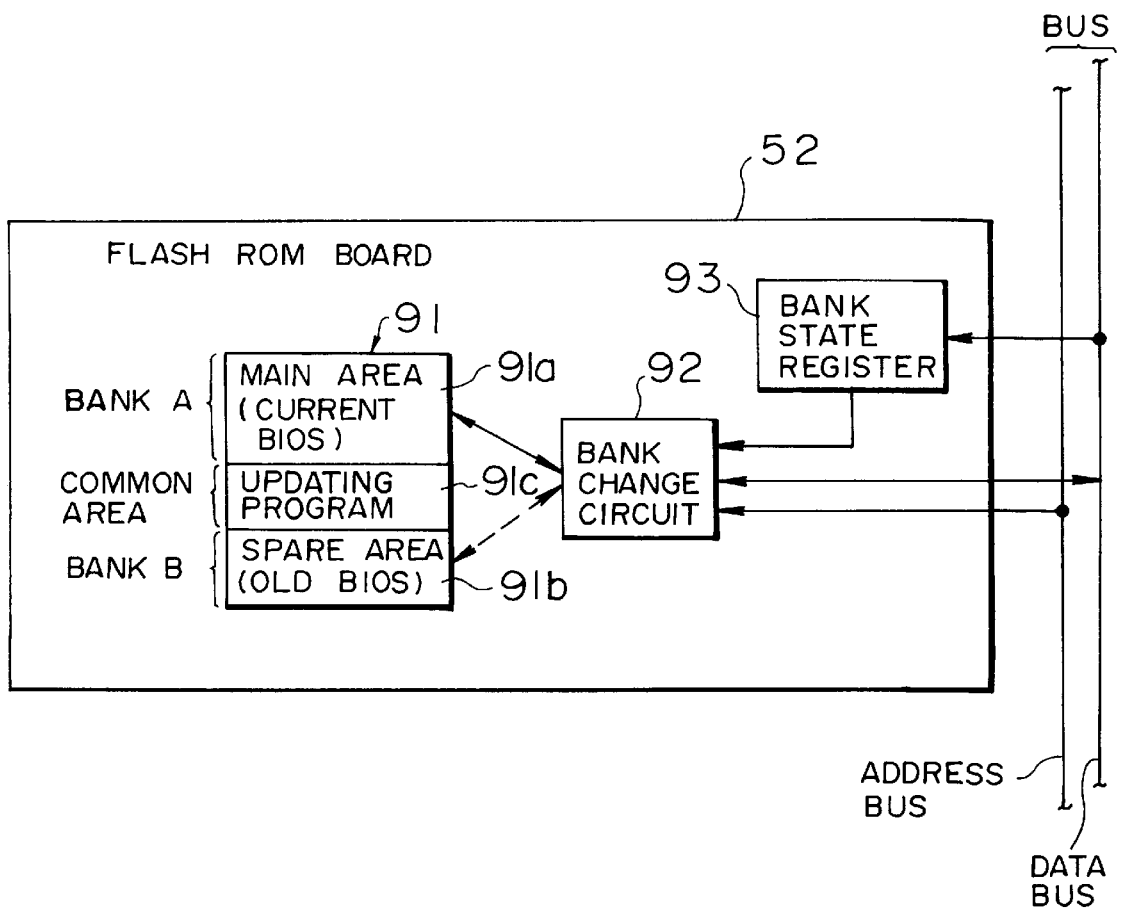
FIG. 6 is a block diagram showing the internal configuration of flash ROM 91 shown in FIG. 5.
Figure 7A:
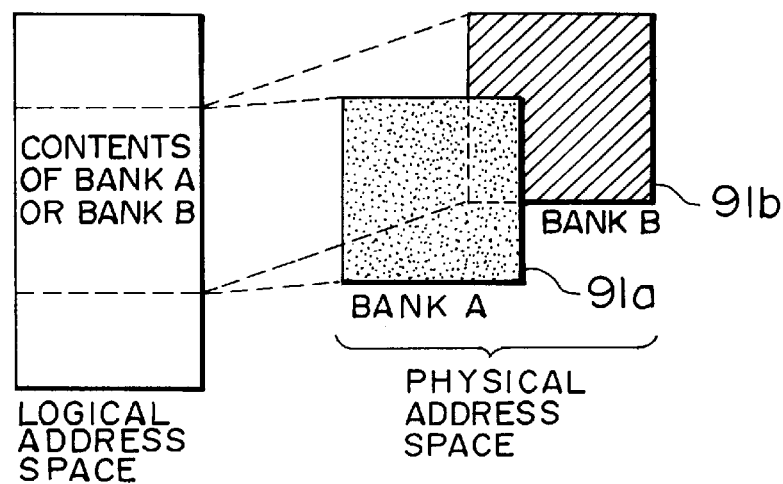
FIGS. 7A–7C are diagrams showing the relationship between a logical address space and a physical address space in flash ROM 91 shown in FIG. 5.
Figure 7B:
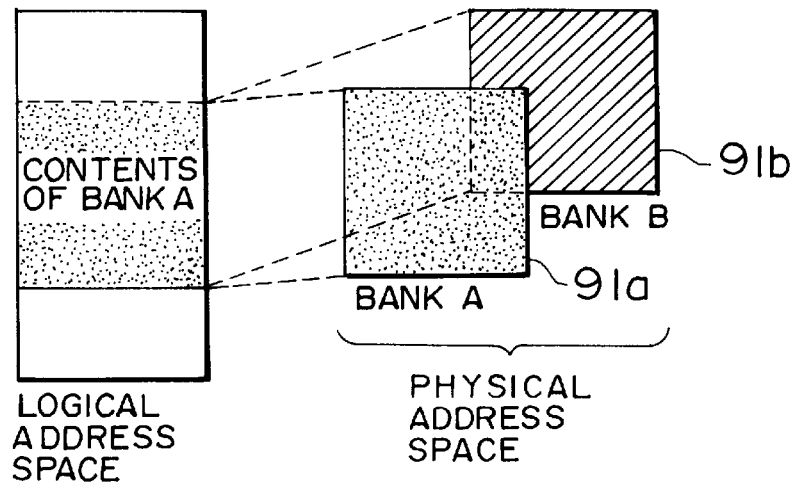
Figure 7C:
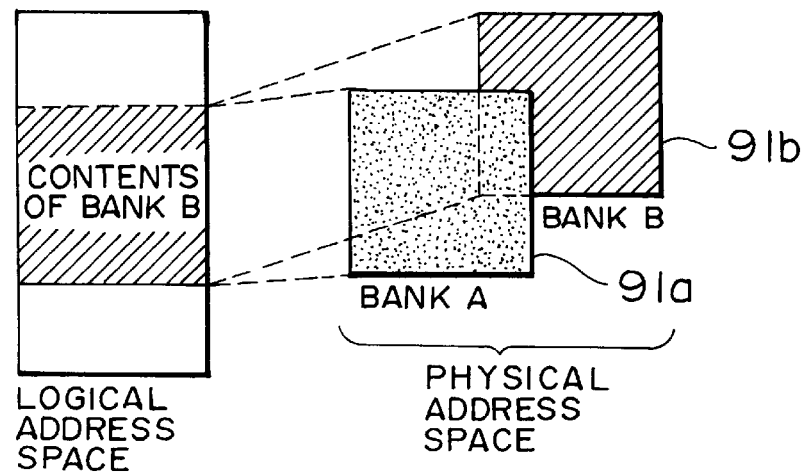

FIG. 6 shows the configuration of the flash ROM board 52. The flash ROM 91 is an erasable and programmable nonvolatile memory for storing data in the program form and other data. The flash ROM 91 is used as two banks: a bank A 91a (main area) and a bank B 91b (spare area). The bank A 91a and the bank B 91b are used as one logical address space by the CPU 51. That is, as shown in FIG. 7A, two physical address spaces (bank A 91a and bank B 91b) are allotted in one logical address space. Contents (data such as programs) (FIG. 7B) stored in the bank A 91a or contents (FIG. 7C) stored in the bank B 91b are read out according to the bank changing operation of a bank change circuit 92. Also, in the case of storing (writing) data such as a program, the data is stored (written) in the bank A 91a or bank B 91b according to the bank changing operation of the bank change circuit 92. The bank change circuit 92 is circuit for converting a logical address addressed by the CPU 51 into an actual physical address in the flash ROM 91 (bank A 91a or bank B 91b).

The bank A 91a of the flash ROM 91 stores a program such as a current new BIOS while the bank B 91b stores a program such as a BIOS before updating (old version). A part of the flash ROM 91 is used as a common area 91c which can be accessed regardless of bank change. That is, the same storage area (physical address) is designated with a predetermined logical address regardless of bank change. In this area, data which is first read to the memory when the processor is started up and a BIOS updating program are stored and the contents of this area cannot be rewritten.

The bank change circuit 92 operates for changeover between the banks A and B in the memory 91 according to a value held by a bank state register 93 formed of a hardware logic circuit to store data such as a program in a storage area designated with addresses supplied via an address bus or to read out data from a storage area. Data to be stored or output is input or output through a data bus.

The bank state register 93 holds a value corresponding to one of the banks A and B which is to be used. This value is supplied from the CPU 51 via the bus. A BIOS and other programs ordinarily used are stored in the bank A. Therefore, the bank state register 93 is holding the value corresponding to the bank A except during a BIOS updating period. In this embodiment, when the power supply for the STB is turned on, the bank state register 93 is reset to the value corresponding to the bank A.

As described above, in the circuit on the flash ROM board 52, the bank A or bank B of the memory section 91 is used according to the value held by the bank state register 93, and data is read out mainly from the bank A except during a BIOS updating period.

Figure 8:
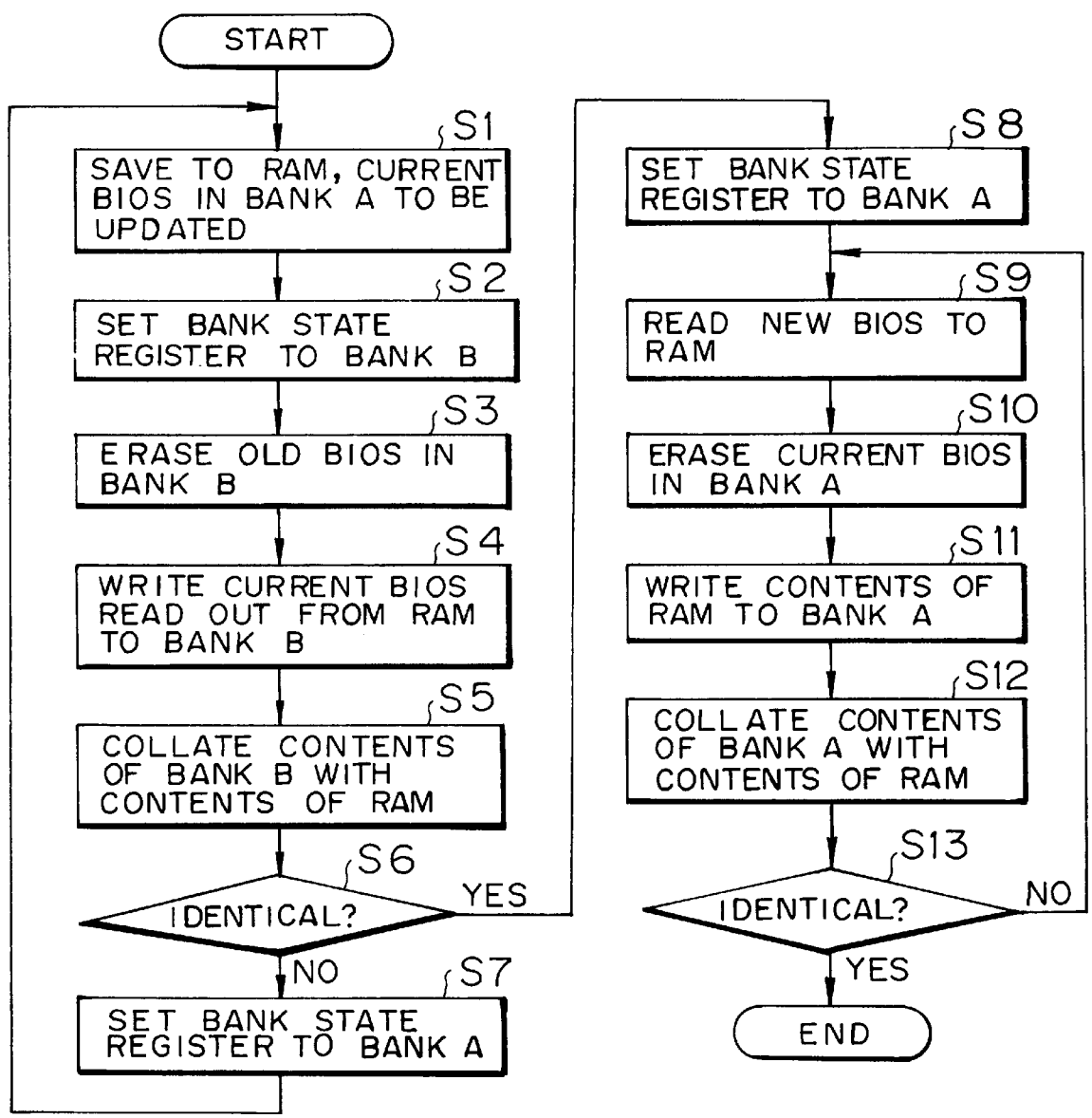
FIG. 8 is a flowchart showing the operation of STB 16 at the time of BIOS updating.
Figure 9:
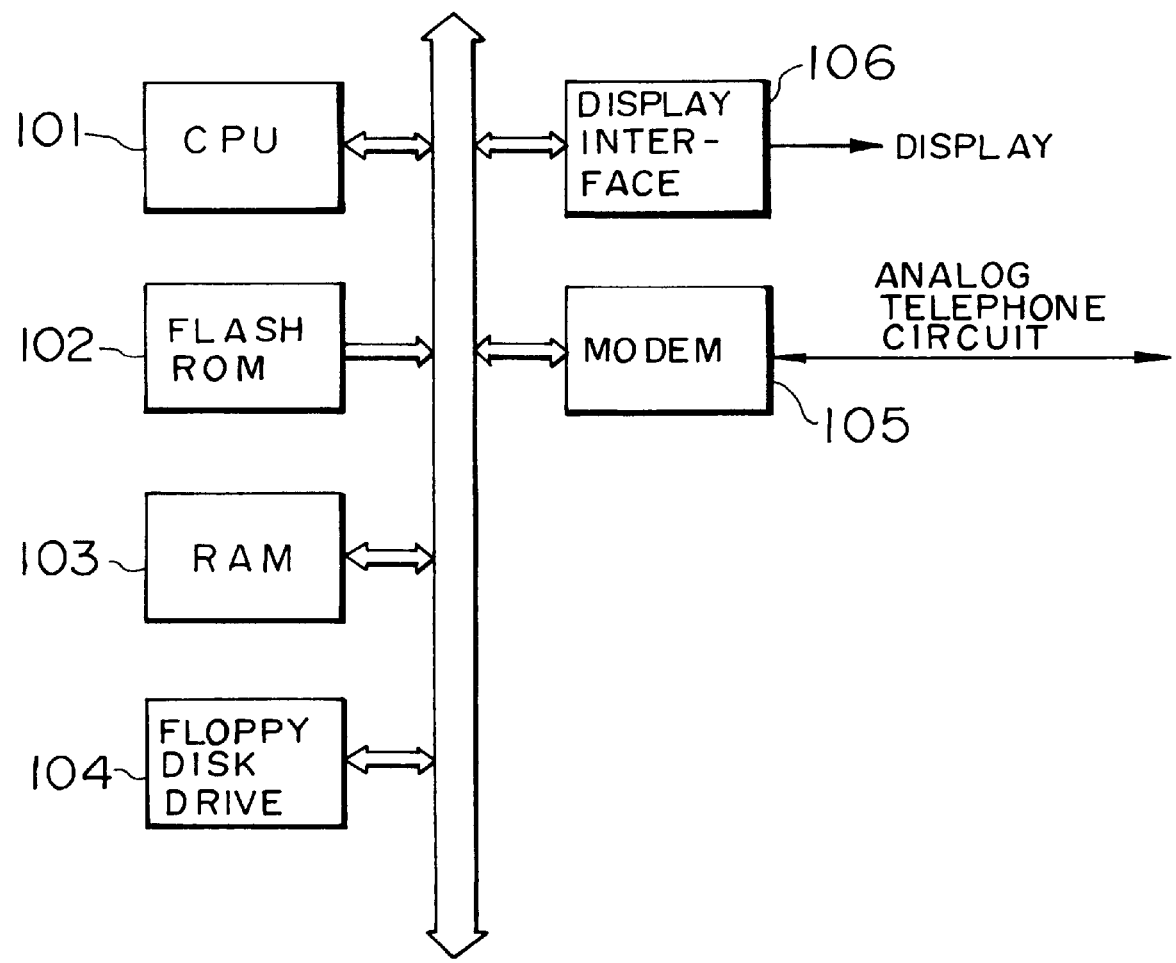
FIG. 9 is a block diagram showing an example of an information processor having a recording unit.

The operation of this embodiment of the invention at the time of updating a BIOS in the flash ROM board 52 will next be described with reference to the flowchart of FIG. 8 and the diagrams of FIGS. 10 to 18. In this embodiment, no unit for driving a portable recording medium such as a floppy disk is provided and, therefore, a new BIOS is supplied from the network interface card 57 for BIOS updating. When the remote commander 63 or the like (e.g., server 1-1 or 1-2 as shown in FIG. 1) is operated to input an instruction to perform BIOS updating, the CPU 51 starts processing described below on the basis of the updating program stored in the common area 91c.

Figure 10:
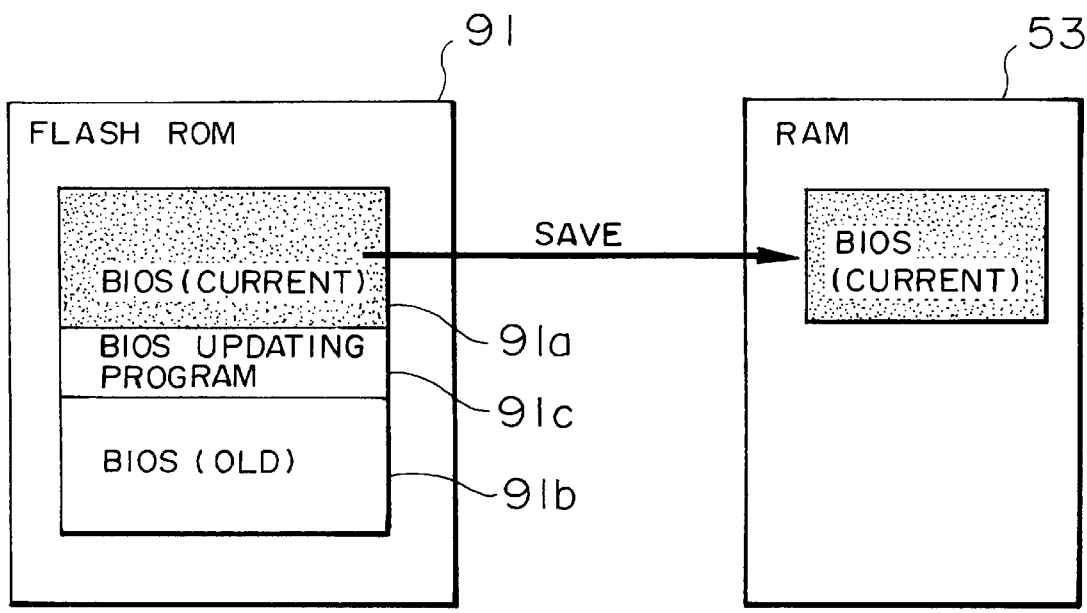
FIGS. 10 through 18 are diagram for explaining the operation of STB 16 at the time of BIOS updating.

First, in step S1, the CPU 51 reads out a current version BIOS which is to be updated, and which has been stored in the bank A 91a of the flash ROM 91, and the CPU 51 temporarily stores (saves) the current BIOS in the RAM 53, as shown in FIG. 10.

Next, in step S2, the CPU 51 changes the value of the bank state register 93 to change the bank A for the bank B.

Figure 11:
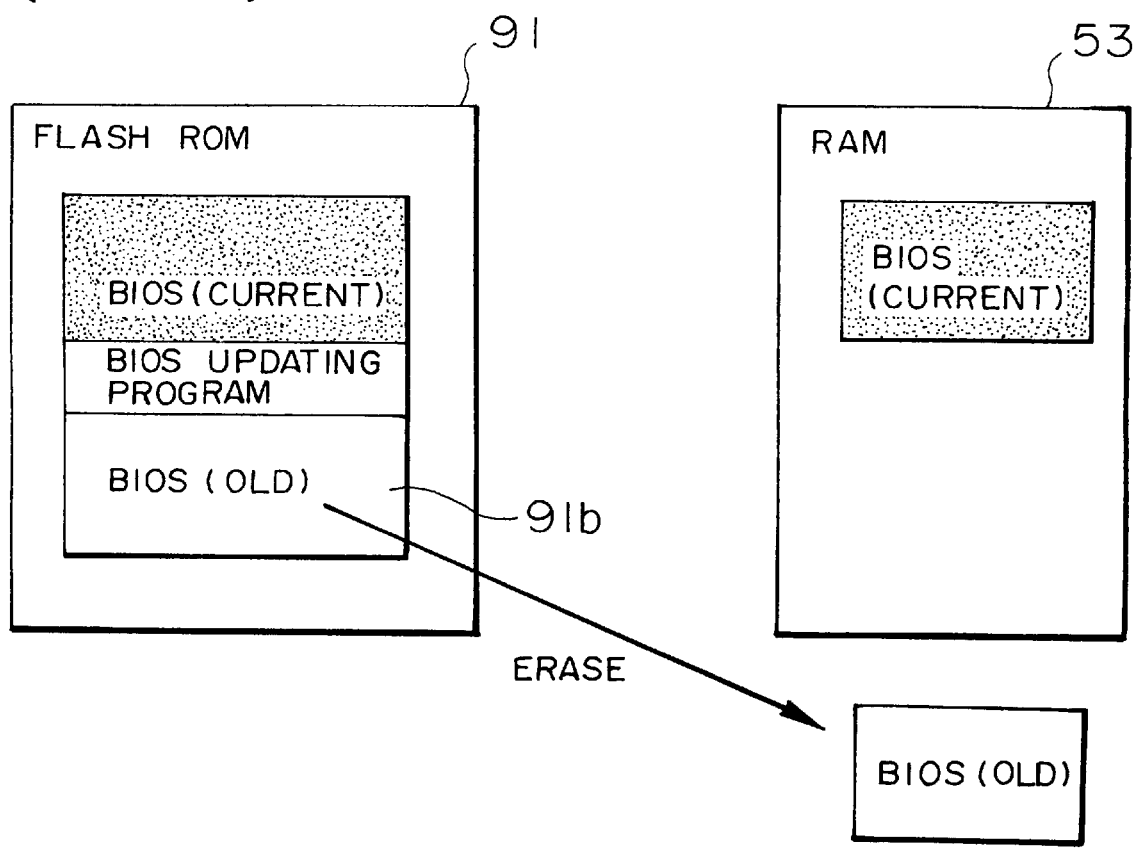
Figure 12:
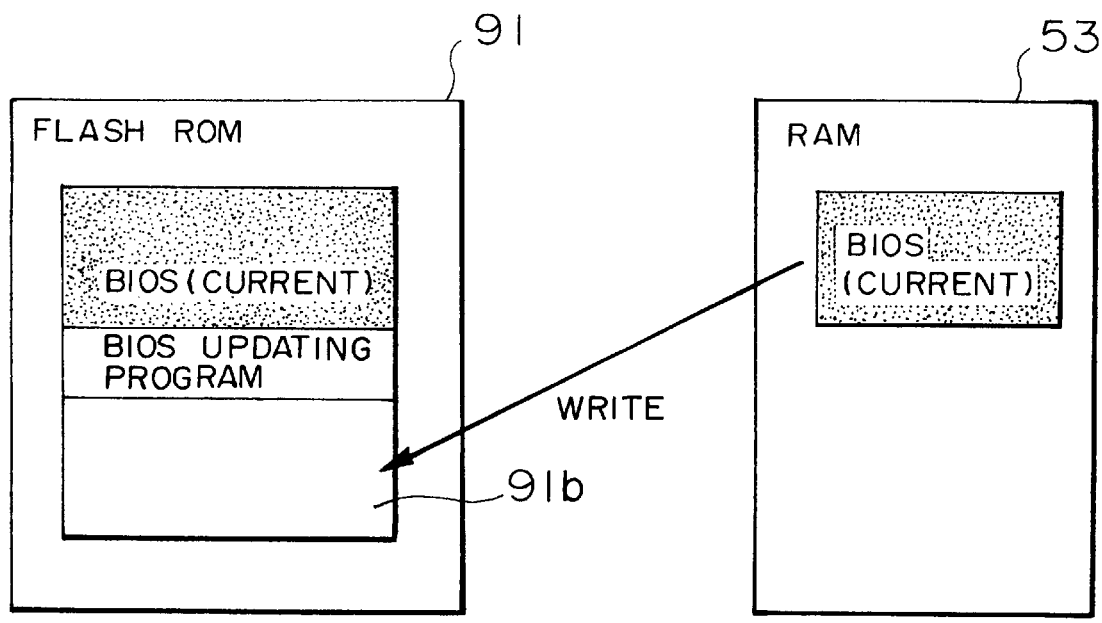

In step S3, the CPU 51 erases the contents, i.e., an old version BIOS, in the bank B of the flash ROM 91, as shown in FIG. 11. In step S4, the CPU 51 reads out the current version BIOS from the RAM 53 and stores the current version BIOS in the bank B 91b, as shown in FIG. 12.

Figure 13:
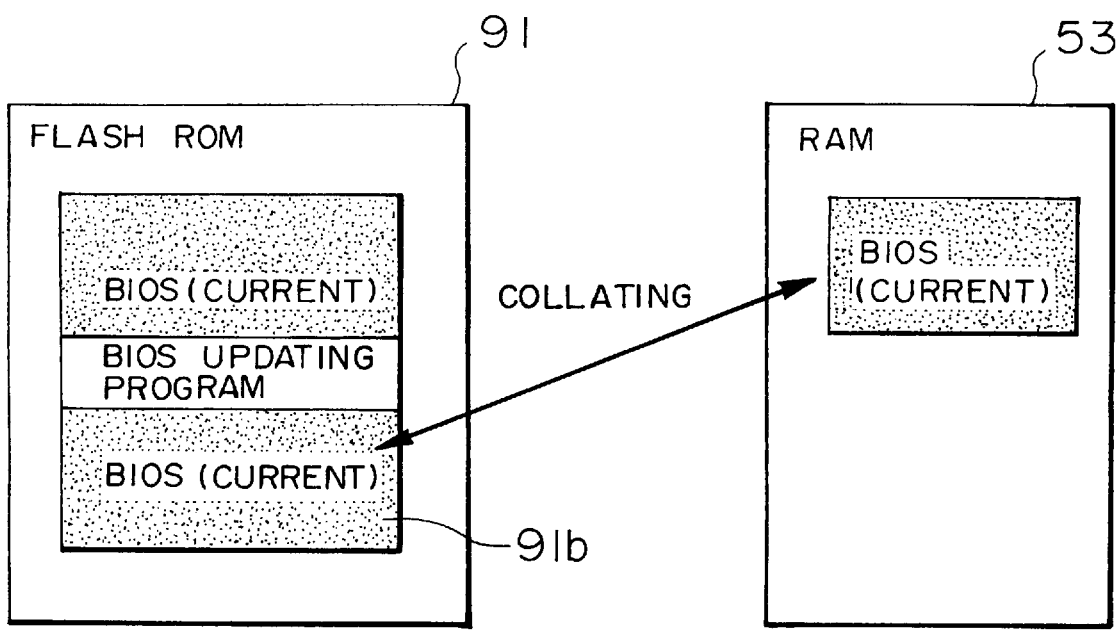

In step S5, the CPU 51 collates the current BIOS in the bank B 91b of the flash ROM 91 with the current BIOS in the RAM 53, as shown in FIG. 13. In step S6, the CPU 51 makes a determination as to whether these two groups of memory contents are identical with each other. If NO, the CPU 51 returns the process to step S1 to again execute the operation of moving the BIOS stored in the bank A 91a of the flash ROM 91 to the bank B 91b via the RAM 53.

If the CPU 51 determines in step S6 that the two groups of BIOS data in the RAM 53 and the bank B 91b of the flash ROM 91 are identical with each other, it moves the process to step S8 to change the value of the bank state register 93, thereby changing the bank B for the bank A.

Figure 14:
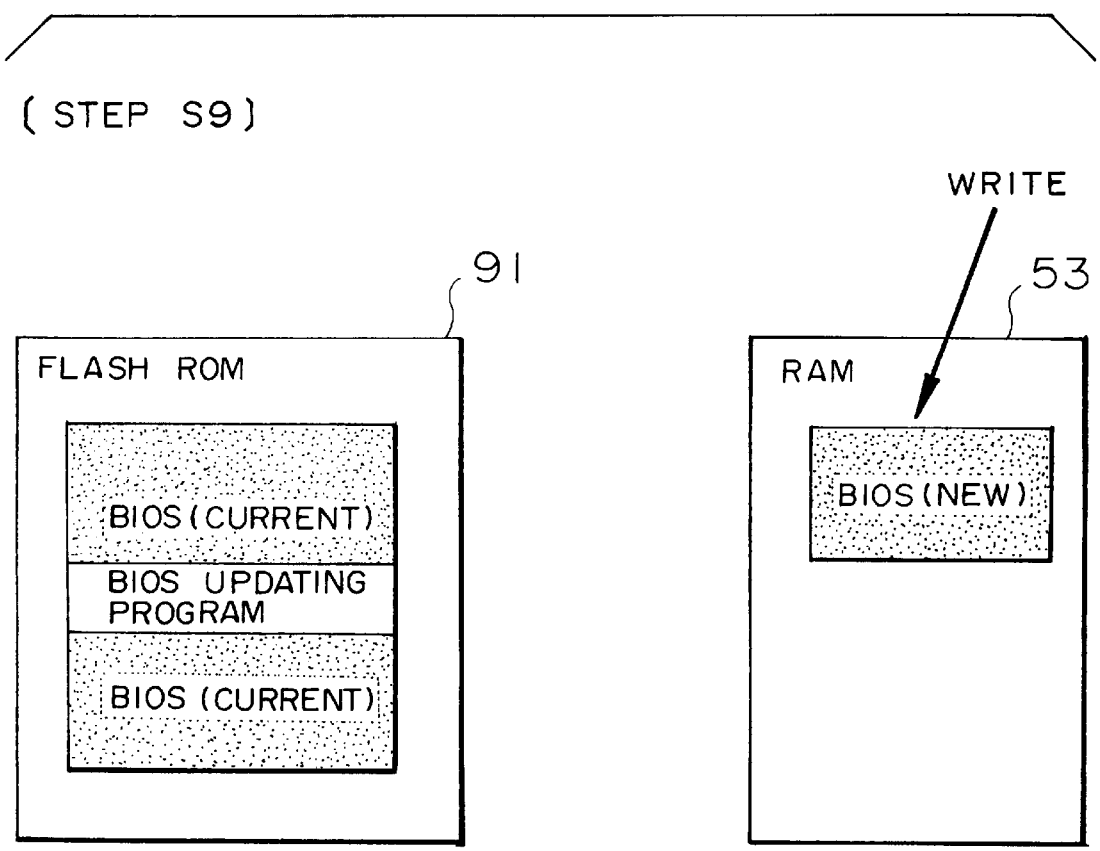

Next, in step S9, the network interface card 57 receives a new BIOS supplied via a predetermined communication network and the home server 11, and the CPU 51 stores in the RAM 53 the new BIOS received by the network interface card 57, as shown in FIG. 14.

Figure 15:
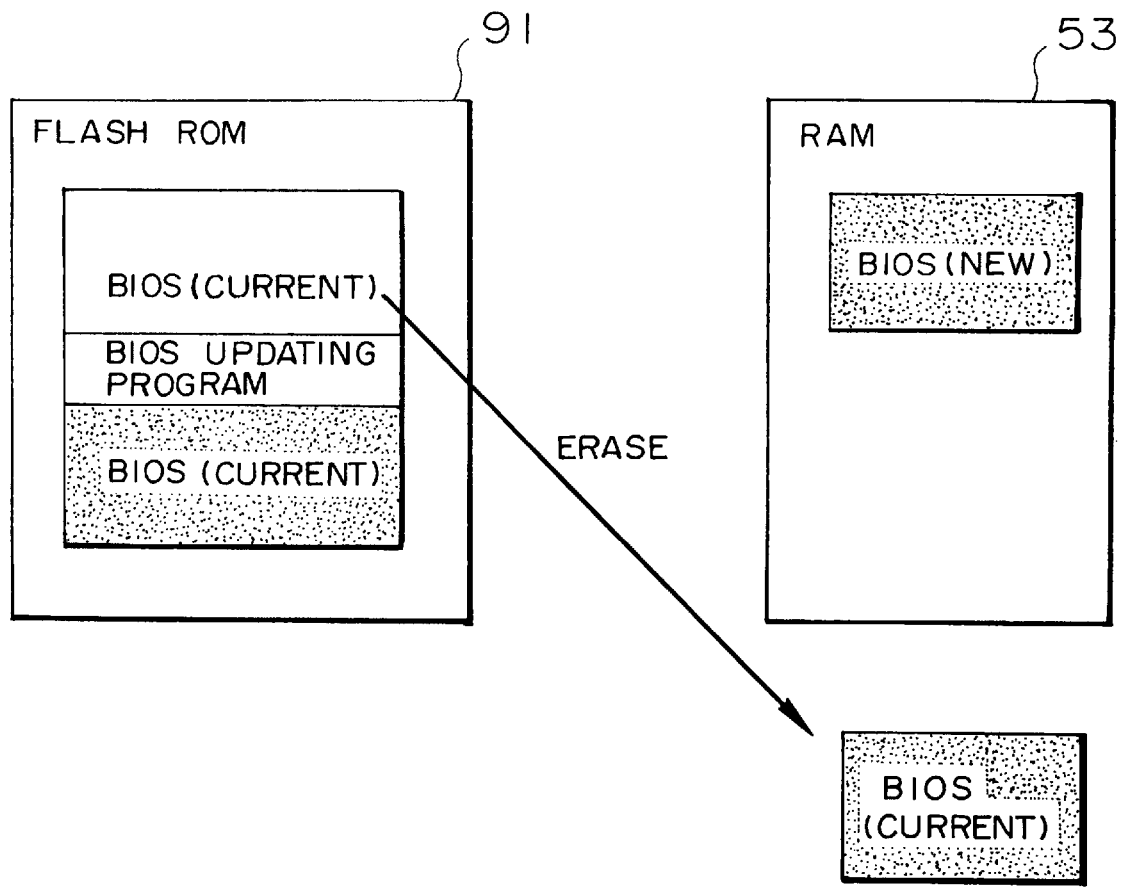
Figure 16:
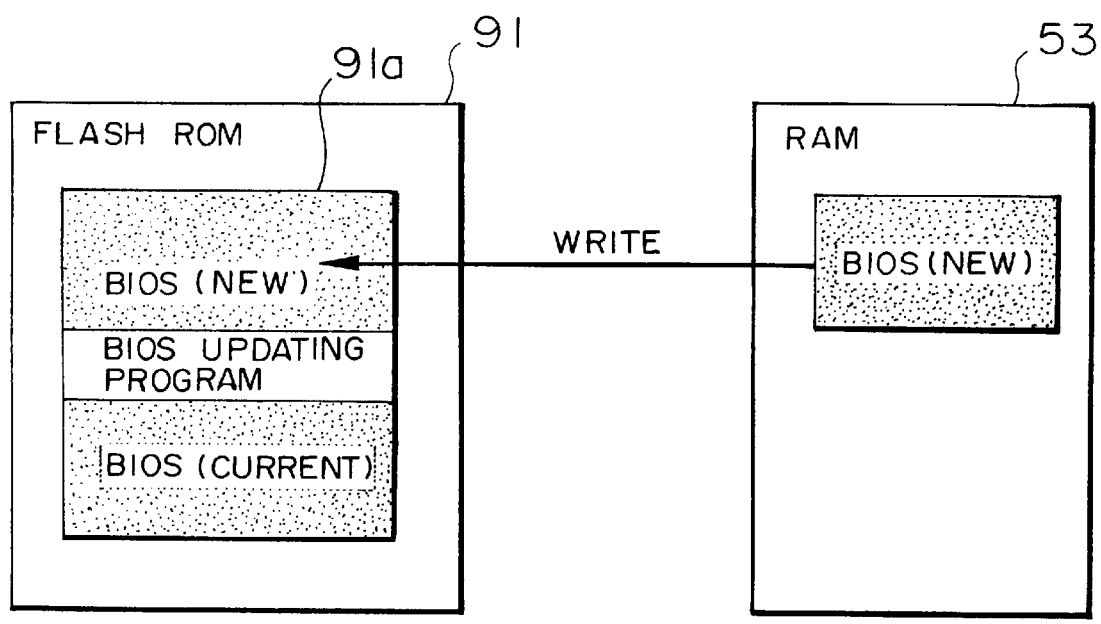

In step S10, the CPU 51 erases the contents (current BIOS) of the bank A of the flash ROM 91, as shown in FIG. 15. Thereafter, in step S11, the CPU 51 stores in the bank A 91a of the flash ROM 91 the new BIOS which is stored in the RAM 53, as shown in FIG. 16.

Figure 17:
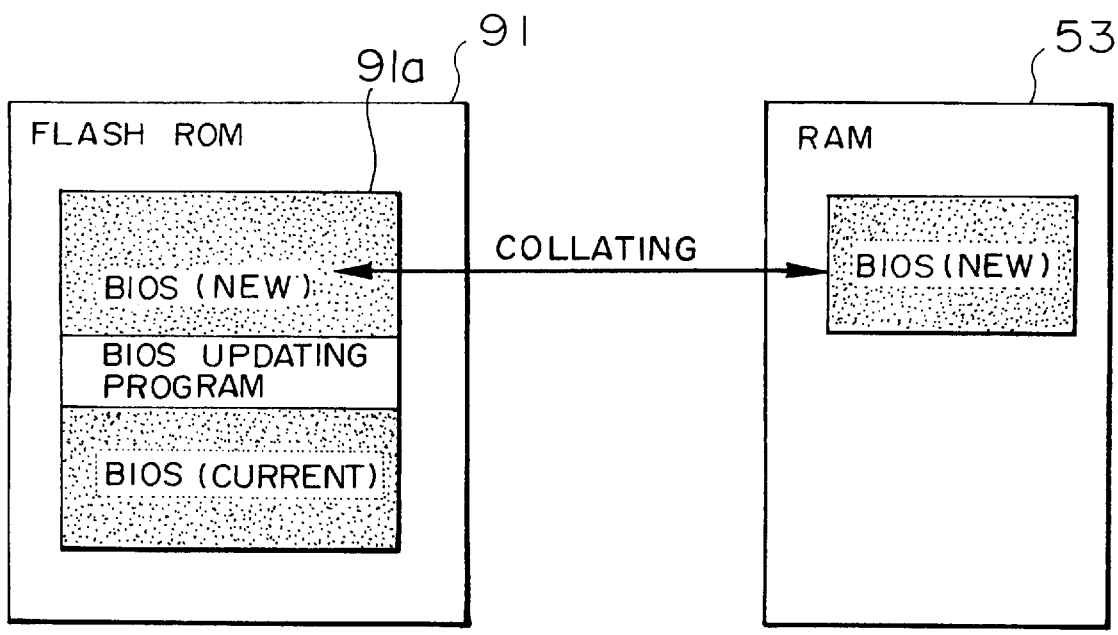

In step S12, the CPU 51 collates the BIOS in the bank A 91a of the flash ROM 91 with the BIOS in the RAM 53, as shown in FIG. 17. In step S13, the CPU 51 makes a determination as to whether these two groups of memory contents are identical with each other. If NO, the CPU 51 returns the process to step S9 to again perform the operation of moving the new BIOS stored in the RAM 53 to the bank A 91a of the flash ROM 91.

Figure 18:
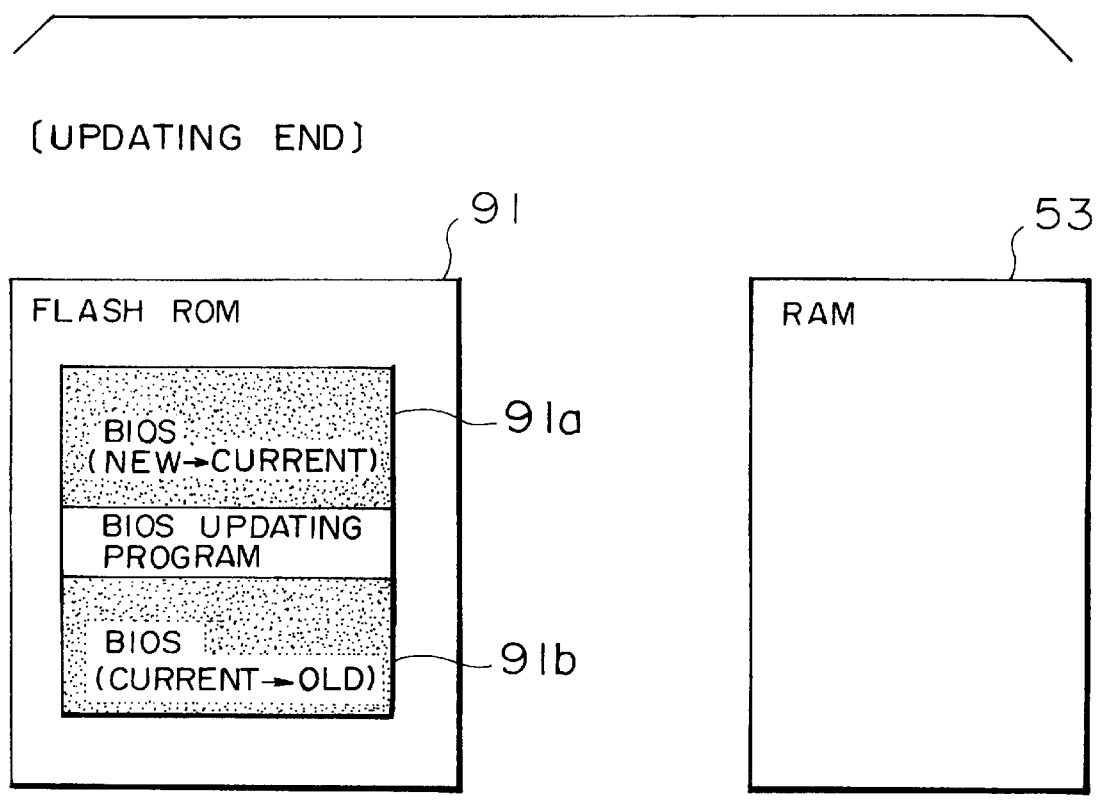

If the CPU 51 determines in step S13 that the two groups of BIOS data in the RAM 53 and the bank A 91a of the flash ROM 91 are identical with each other, it stops BIOS update processing with an update processing result shown in FIG. 18.

As described above, an old BIOS in the bank A 91a of the flash ROM 91 is moved to the bank B 91b in steps S1 to S7, and a new BIOS supplied via a predetermined communication network is stored in the bank A 91a in steps S8 to S13, thus performing BIOS updating. If the new BIOS does not run well, a sequence of operations reverse to that shown as steps S1 to S7 is performed to move the BIOS in the bank 91b of the flash ROM 91 to the bank A 91a via the RAM 53, thereby reinstalling the former BIOS.

While in the above-described embodiment the flash ROM 91 having a plurality of banks is used, a plurality of flash ROMs each having a single storage area may be used in place of the flash ROM 91.

Any program (e.g., an operating system) other than the BIOS described above as an updated program may also be updated in accordance with the present invention. Further, flash ROMs may also be used in the home server 11, the personal computers 12-1 and 12-2 and other components.

In the information processor and the program updating method of the present invention for updating a current basic program stored in a main area of storage means by replacing the current basic program with a new basic program on the basis of an updating program stored in a common area of the storage means, the current basic program read out from the main area is copied to the spare area of the storage means, and the new basic program is finally written to the main area on the basis of the updating program. Thus, BIOS updating can be performed after saving an old BIOS to a spare area even in an apparatus having no such a recording unit as a floppy disk. Even in a case where BIOS writing ends in failure, the old BIOS can be reinstalled immediately, thus preventing the BIOS from being lost by an operation error or the like.

The information processing system of the present invention has information providing means for providing information through a predetermined transmission channel, and information processing means for performing updating on the basis of an updating program stored in a common area of storage means. This updating includes copying to a spare area of the storage means a current basic program read out from a main area of the storage means and finally writing to the main area of the storage means a new basic program supplied through the transmission channel. If such a system is used, BIOS updating can be performed by using a new BIOS supplied through a network line such as a transmission channel after saving an old BIOS to a spare area even in an apparatus having no such a recording unit as a floppy disk.

What is claimed is:

1. A program updating method of updating a current basic program stored in a main area of storage means by replacing the current basic program with a new basic program on the basis of an updating program stored in a common area of the storage means, said method comprising the steps of:
   copying to the spare area of the storage means the current basic program read out from the main area; and
   finally writing the new basic program to the main area on the basis of the updating program.

2. An information processor comprising:
   storage means having a main area in which a current basic program is stored, a common area in which an updating program describing a procedure for updating the basic program is stored, and a spare area in which the basic program is stored before it is updated; and
   processing means for performing updating on the basis of the updating program stored in the common area of said storage means, said updating including copying to said spare area the current basic program read out from said main area and finally writing a new basic program to said main area.

3. An information processor according to claim 1, wherein said basic program comprises a basic input/output system which is a group of hardware-dependent control programs.

4. An information processor according to claim 1, further comprising receiving means for receiving information supplied through a predetermined transmission channel, said receiving means receiving a new basic program as said information through the transmission channel, said processing means performing updating on the basis of the updating program stored in the common area of said storage means, said updating including copying to the spare area of said storage means the current basic program read out from the main area of said storage means and finally writing the new basic program received by said receiving means to the main area of said storage means.

5. An information processor according to claim 4, wherein said receiving means receives information about video on-demand service through said transmission channel.

6. An information processor according to claim 1, wherein said memory means is formed of an electrically erasable and programmable read-only memory.

7. An information processor according to claim 6, wherein the main and spare areas of said storage means are allotted as separate banks in one logical address space, and one of the banks is alternatively selected by bank changing to be addressed.

8. An information processing system comprising:
   information providing means for providing information through a predetermined transmission channel; and
   information processing means for performing updating on the basis of an updating program stored in a common area of storage means, said updating including copying to a spare area of the storage means a current basic program read out from a main area of the storage means and finally writing to the main area of the storage means a new basic program supplied through said transmission channel.

9. A program updating method of updating a current basic program stored in a main area of storage means by replacing the current basic program with a new basic program on the basis of an updating program stored in a common area of the storage means, said method comprising the steps of:

saving to a temporary storage area the current basic program read out from the main area;

writing the current basic program saved to the temporary storage area to a spare area of the storage means;

collating the current basic program written to the spare area of the storage means with the current basic program saved to the temporary storage area;

writing to the temporary storage area a new basic program supplied from an external source and thereafter writing the new basic program to the main area of the storage means; and collating the new basic program written to the main area of the storage means with the new basic program written to the temporary storage area.

* * * * *